United States Patent [19]

Marshall

[11] Patent Number: 4,566,574
[45] Date of Patent: Jan. 28, 1986

[54] MULTIPLE-DISC ELECTROMAGNETIC CLUTCH

[75] Inventor: Jeffrey F. Marshall, Waukesha, Wis.

[73] Assignee: PT Components, Inc., Indianapolis, Ind.

[21] Appl. No.: 577,244

[22] Filed: Feb. 6, 1984

Related U.S. Application Data

[63] Continuation of Ser. No. 309,370, Oct. 7, 1981, abandoned.

[51] Int. Cl.⁴ .............................................. F16D 27/10
[52] U.S. Cl. ................................. 192/84 C; 192/18 B
[58] Field of Search ............. 192/84 C, 84 A, 84 AA, 192/84 AB, 18 B

[56] References Cited

U.S. PATENT DOCUMENTS

| | | | |
|---|---|---|---|
| 942,186 | 12/1909 | Ravenshaw | 192/84 C |
| 3,093,227 | 6/1963 | Straub et al. | 192/84 C |
| 3,337,013 | 8/1967 | Wrensch | 192/84 C |
| 3,361,238 | 1/1968 | Yokel | 192/84 C |
| 3,384,213 | 5/1968 | Bernard et al. | 192/84 C |
| 3,484,816 | 12/1969 | Davidson | 192/84 C |
| 3,674,122 | 7/1972 | Buisker | 192/18 B |
| 4,079,820 | 3/1978 | Mattli | 192/84 C |

*Primary Examiner*—George H. Krizmanich
*Attorney, Agent, or Firm*—Robert A. Brown

[57] ABSTRACT

A magnetic clutch for selectively connecting a rotatable input shaft to a rotatable output hub using magnetic flux. An output disc connected to the output hub is mounted between a pair of input discs connected to the input shaft. Magnetic flux passing through the output disc and the input disc clamps the output discs between the input discs. The magnetic flux linking the input and output discs provide additional torque to cause the output disc to rotate along with the input disc, so a relatively small clutch can provide a large output torque.

9 Claims, 3 Drawing Figures

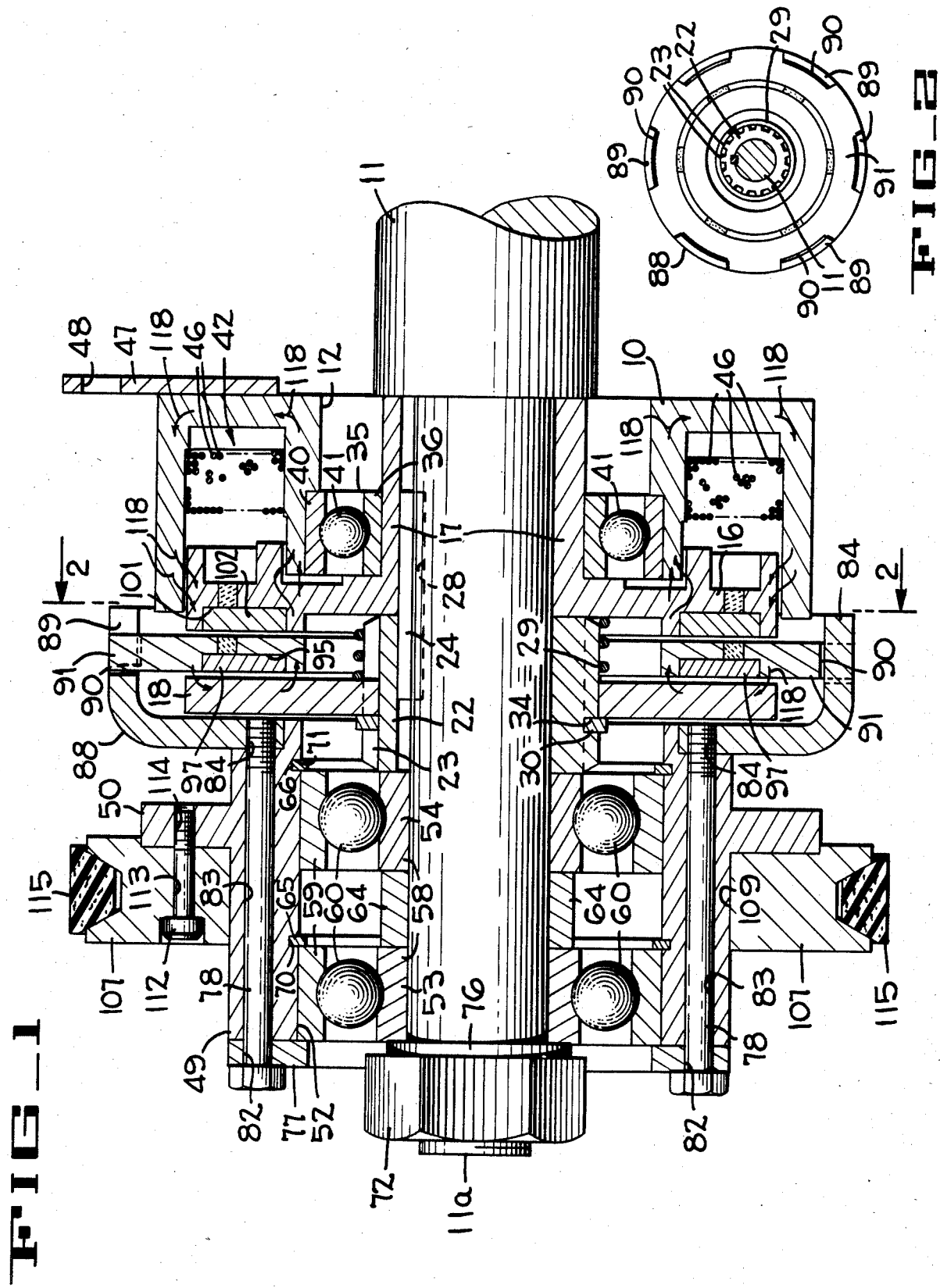

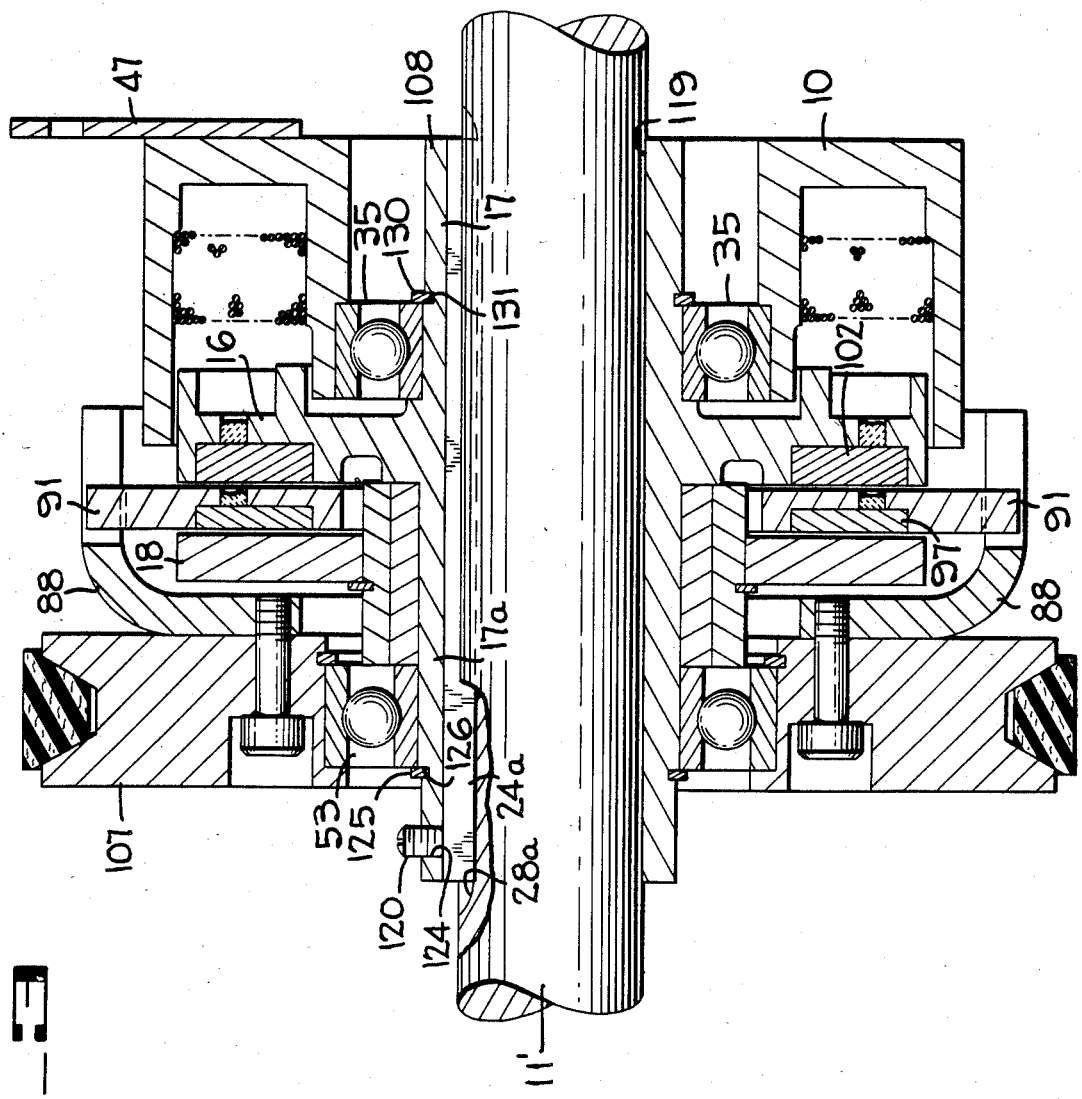
FIG_3

MULTIPLE-DISC ELECTROMAGNETIC CLUTCH

This is a continuation of application Ser. No. 309,370, filed Oct. 7, 1981, now abandoned.

BACKGROUND OF THE INVENTION

1. Field of the Invention

This invention relates to clutches and, more particularly, to an electromagnetic clutch having increased torque capability.

2. Description of the Prior Art

Mechanical clutches for selectively coupling torque from a rotating shaft, powered by a motor or other power source, to a rotatable load is well known in the art. An input disc connected to the rotating input shaft is mounted parallel to an output disc connected to the load. When the input and output discs are separated the load is isolated from the power source. When the power is to be transferred from the power source to the load the discs are pressed together by various means. If the load connected to the output disc is too large for the amount of friction between the disc, slippage will occur between the disc and the power will not be transferred to the load. Various methods of pressing the discs together to couple the output to the input include using springs, hydraulics or magnetic flux to force the discs together. Prior art electromagnetic clutches employ an input disc and an output disc and a magnetic structure which forces these discs together when a magnetic flux links portions of the magnetic structure. Such a clutch is limited in the amount of force which pulls the discs together and limited in the amount of torque transferred between the input and output shafts connected to these discs.

SUMMARY OF THE INVENTION

The present invention alleviates some of the disadvantages of the prior art by employing an output disc mounted between a pair of input discs. The input discs are slidably connected to a rotatable input shaft and the output disc is connected to an output hub. An energizing coil supplies a magnetic flux which links a first of the input disc to the other input disc through the output disc. The magnetic flux through the output disc is generally at a right angle to the surface of the output disc to increase the force that the rotating input discs exert on the output disc and increase the torque which can be coupled from the input shaft to the output hub. The apparatus of the present invention can also be used as an electromagnetically operated brake by modifying the structure to rigidly connect the output disc to a nonmovable member.

BRIEF DESCRIPTION OF THE DRAWINGS

FIG. 1 is a central section of a multiple-disc electromagnetic clutch of the present invention.

FIG. 2 is a vertical section of the electromagnetic disc of FIG. 1 taken along the line 2—2 of FIG. 1.

FIG. 3 is a central section of another embodiment of the electromagnetic clutch of the present invention.

DESCRIPTION OF THE PREFERRED EMBODIMENT

The electromagnetic clutch shown in FIGS. 1 and 2 includes an annular hollow body member 10 having an input shaft 11 rotatably mounted through a longitudinal bore 12 in the body member 10. An annular rotor disc 16 having an axially extending flange 17, and a primary disc 18 are mounted about the input shaft 11 and rotate with the shaft 11. A splined drive hub 22 having a plurality of splines 23 (FIG. 2) is mounted between the primary disc 18 and the input shaft 11. The splines secure the drive hub 22 to the primary disc 18 and a key 24 mounted in a slot 28 in the shaft 11, secures the primary disc 18 and the rotor disc 16 to the shaft 11 to cause the shaft and the discs 16, 18 to rotate together. However, the primary disc 18 is free to slide axially along the splines 23 about the shaft 11 to vary the spacing between the discs 16 and 18. A spring 29 biases the disc 18 away from the disc 17 and an annular ring 30, mounted in a groove 34 in the hub 22, limits the distance the primary disc 18 moves away from the rotor disc 16. A bearing 35 having an inner bearing race 36, an outer bearing race 40 and a plurality of balls 41 between the bearing races, rotatably mounts the shaft 11 and the discs 16, 18 to the body member 10.

The body member 10 includes a field coil 42 having a plurality of windings 46 which can be secured in place by an epoxy in a well known manner. A restraining bracket 74 which is welded or otherwise secured to the input end of the body 10 includes a bore 48 through which a pin or other fastener can be placed to secure the body member 10 to a device (not shown) which uses the clutch. The fastener must be placed in such a manner to prevent any preloading of the bearings 41.

The output portion of the clutch includes an annular output hug 49 having a radially extending flange 59 adjacent one end and an axial bore 52 extending therethrough. A pair of bearings 53, 54 each having an inner bearing race 58, an outer bearing race 59 and a plurality of balls 60, rotatably mount the output hub 49 about the input shaft 11. An annular sleeve 64, and a pair of annular rings 65, 66 mounted in a pair of annular grooves 70, 71 in the hub 49 position the bearings 53, 54 inside the bore 52 of the hub. A nut 72 threaded on the left end 11a (FIG. 1) of the input shaft 11, and a washer 76 secure the inner race 58 of the bearing 54 against the drive hub 22. An annular end plate 77 is secured against the outer bearing race 59 by a plurality of bolts 78, each bolt extending through a bore 82 in the plate 77 and through a bore 83 in the output hub 49 into a threaded bore 84 in an annular cup 88.

The radially outer portion of the cup 88 includes a plurality of radial fingers 89 (FIGS. 1, 2) each extending through a slot 90 in an output disc 91. The output disc 91 is supported and centered about the drive hub 22 by the fingers 89 of the cup 88, and the output disc 91 "floats" between the primary disc 18 and the rotor disc 16 when the discs are in a nonmagnetized position as shown in FIG. 1. When the discs are magnetized, the primary disc 18 moves to the right forcing the floating output disc 91 to the right against the disc 16 to clamp the output disc between discs 16 and 18. The disc 91 includes a recessed pocket 95 having a slab of friction material 97 secured in the pocket by a quantity of adhesive material. The friction material decreases the wear between the output disc 91 and the primary disc 18 when the discs are clamped together. The rotor disc 16 also includes a pocket 101 having a slab of friction material 102 secured in the pocket by a quantity of adhesive. The friction material 102 decreases the wear between the rotary disc 16 and the output disc 91 when these discs are clamped together.

An annular output pulley 107 having axial bore 109 is secured to the output hub 49 by a plurality of bolts 112 each mounted through a bore 113 in the pulley and secured in a threaded bore 114 in the flange 50. A V-belt 115 can be used to transfer power from the pulley 107 to a variety of devices (not shown).

To secure the output hub 49 to the input shaft 11 an electrical current is supplied to the field coil 42, causing a magnetic flux to follow a path through the body member 10 and the discs 16, 18, 91 as shown by the arrows 118 (FIG. 1). The magnetic flux enters and leaves the disc 91 at approximately right angles to the surface of the disc. This magnetic flux exerts a force which pulls discs 18 and 91 to the right toward the body member 10 to clamp the output disc 91 between input discs 16 and 18. In addition to the clamping action, the flux links the disc 91 to discs 16, 18 to produce a force which causes disc 91 to be pulled through with discs 16, 18. Routing the magnetic flux through the input and output discs produces a large torque from input shaft to output hub, with a relatively small clutch structure. The torque is several times as great as in prior art clutches of the same physical size. The proper routing of the flux is achieved by using weld materials and "soft" magnetic material for the flux carrying members.

Another embodiment of the present invention disclosed in FIG. 3 differs from the embodiment of FIG. 1 by the inclusion of another axial flange 17a on the motor disc 16 which combines with the axial flange 17 to form a sleeve 108 extending the length of the clutch. A drive shaft 11' extends through a longitudinal bore 119 in the sleeve 108 and the shaft 11' is secured to the sleeve 108 by one or more setscrews 120 each extending through a threaded bore 124 in the sleeve 108. The pulley 107, the bearing 53, the cup 88 and the discs 18, 91 are retained on the sleeve 108 by an annular snap ring 125 mounted in an annular groove 126 in the sleeve 108. The bearing 35 is retained on the sleeve 108 by an annular snap ring 130 mounted in an annular groove 131. A key 24a mounted in a slot 28a in the shaft 11', secures the rotor disc 16 to the shaft 11' to cause the shaft and the discs 16, 18 to rotate together.

The electromagnetic clutch of the present invention uses a magnetic flux to link an output disc to a pair of input discs and to clamp the output disc between the two input discs. The output torque is several times as large as in prior art clutches of the same physical size. The structure can also be used as an electromechanical brake by mounting the output disc in a fixed position to prevent rotation thereof.

Although the best mode contemplated for carrying out the present invention has been herein shown and described, it will be apparent that modification and variation may be made without departing from what is regarded to be the subject matter of the invention.

What is claimed is:

1. A magnetic clutch for selectively connecting a rotatable input shaft to a rotatable output hub, said clutch comprising:
   a first input disc fixedly mounted on said input shaft for rotation therewith;
   a second input disc axially movably mounted on said input shaft for rotation therewith;
   an output disc coaxial with said input shaft supported by said output hub for floating axial movement between said first and said second input discs;
   outer annular means on said first input disc and said output disc forming first magnetic poles;
   inner annular means on said first input disc and said output disc forming second magnetic poles;
   annular, rigid insulation means separating said first and said second magnetic poles;
   single spring means for biasing said first and said second input discs axially away from said output disc;
   connecting means supporting said output disc for rotation with said output hub; and
   means for developing a magnetic flux that is directed through said first magnetic poles in said first input disc and said output disc to said second input disc and returns through said second magnetic poles in said output disc and said first input disc, whereby said second input disc and said output disc are drawn towards said fixed first input disc to clamp said output disc between said first and said second input discs so that the torque between said input shaft and said output hub is greatly increased.

2. A magnetic clutch as defined in claim 1 comprising:
   first frictional means on said first input disc for at times engaging a surface of said output disc;
   second frictional means on said output disc for at times engaging a surface of said second input disc;
   said first and said second frictional means being effective when engaging said output disc and said second input disc to decrease wear between said output disc and said first and said second input discs.

3. A magnetic clutch as defined in claim 1 wherein said connecting means comprises:
   annular cup means connected to said output hub;
   axially extending finger means formed on a circumferential surface of said cup means;
   said output disc having slot means formed on its peripheral surface adapted to receive and engage said finger means;
   said finger means when engaged with said slot means being effective to rotate said output disc with said output hub.

4. A magnetic clutch as defined in claim 1 wherein said magnetic flux through said output disc is generally at right angles to the surface of said output disc.

5. A magnetic clutch as defined in claim 1 including means for slidably connecting at least one of said input discs to said input shaft to facilitate moving said input discs tightly against said output disc when said magnetic flux links said input and said output discs.

6. A magnetic clutch for selectively connecting a rotatable input shaft to a rotatable output hub, said clutch comprising:
   a first input disc fixedly mounted on said input shaft for rotation therewith; Pp1 a second input disc axially movably mounted on said input shaft for rotation therewith;
   an output disc coaxial with said input shaft supported by said output hub for floating axial movement between said first and said second input discs;
   said first input disc and said output disc having formed thereon outer and inner annular means separated by annular, rigid insulation means;
   first frictional means on said first input disc for engaging a surface of said output disc;
   second frictional means on said output disc for engaging a surface of said second input disc;
   connecting means for supporting said output disc for rotation with said output hub; and
   means for developing a magnetic flux effective to flow from the outer annular means of said first input disc through the outer annular means of said output disc to said second input disc and return through the inner annular means of said output disc and said first input disc, whereby said second input disc and said output disc are drawn towards said fixed first input disc to clamp said output disc between said first input disc and said second input disc to greatly increase torque between said input shaft and said output hub and to decrease wear between said output disc and said first and second input discs.

7. A magnetic clutch as defined in claim 6 including means for biasing said first input disc away from said second input disc to separate said output disc from said first and said second input discs in the absence of a magnetic flux.

8. A magnetic clutch as defined in claim 6 including means for connecting said output disc to said output hub to facilitate axial movement of said output disc relative to said output hub.

9. A magnetic clutch as defined in claim 6 wherein the magnetic flux path is routed through said first input disc, through said output disc and through said second input disc generally at right angles to the surface of said output disc in the portion of said flux path through said output disc.

* * * * *